(12) United States Patent
Licht et al.

(10) Patent No.: US 7,749,604 B2
(45) Date of Patent: Jul. 6, 2010

(54) LAMINATING ADHESIVES CONTAINING POLYURETHANE AND EPOXIDE RESIN

(75) Inventors: Ulrike Licht, Mannheim (DE); Bernd Meyer-Roscher, Neustadt (DE); Andre Burghardt, Bobenheim-Roxheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 747 days.

(21) Appl. No.: 10/579,715

(22) PCT Filed: Nov. 16, 2004

(86) PCT No.: PCT/EP2004/012975

§ 371 (c)(1),
(2), (4) Date: May 17, 2006

(87) PCT Pub. No.: WO2005/049683

PCT Pub. Date: Jun. 2, 2005

(65) Prior Publication Data

US 2007/0148445 A1 Jun. 28, 2007

(30) Foreign Application Priority Data

Nov. 18, 2003 (DE) ................................. 103 53 953

(51) Int. Cl.
*B32B 27/38* (2006.01)
*B32B 27/40* (2006.01)
*B32B 27/26* (2006.01)
*C08L 63/00* (2006.01)
*C08L 75/04* (2006.01)

(52) U.S. Cl. ..................... 428/413; 428/423.1; 523/402; 525/528

(58) Field of Classification Search ....................... None
See application file for complete search history.

(56) References Cited

U.S. PATENT DOCUMENTS

| 4,925,885 | A | * | 5/1990 | Rosthauser et al. | 523/415 |
| 5,492,550 | A | * | 2/1996 | Krishnan et al. | 51/298 |
| 5,532,058 | A | | 7/1996 | Rolando et al. | |
| 5,656,701 | A | * | 8/1997 | Miyamoto et al. | 525/453 |
| 5,662,966 | A | * | 9/1997 | Kobayashi | 427/385.5 |
| 6,287,698 | B1 | | 9/2001 | Zhu et al. | |
| 2006/0003166 | A1 | * | 1/2006 | Wissing et al. | 428/413 |

FOREIGN PATENT DOCUMENTS

| DE | 102 19 687 | | 11/2003 |
| EP | 0 100 508 | | 2/1984 |
| EP | 0 324 370 | | 7/1989 |
| EP | 0 542 072 | | 5/1993 |
| EP | 0 922 720 | | 6/1999 |
| JP | 08-113704 | * | 5/1996 |
| JP | 2003-221787 | * | 8/2003 |

OTHER PUBLICATIONS

Technical Data Sheet for EPI-REZ WD-510, provided by Hexion Specialty Chemicals (2008).*

* cited by examiner

*Primary Examiner*—Michael J Feely
(74) *Attorney, Agent, or Firm*—Oblon, Spivak, McClelland, Maier & Neustadt, L.L.P.

(57) ABSTRACT

Aqueous composition comprising
a polyurethane (A)
an epoxy resin (B) obtainable by reacting compounds having epoxide groups with diols or polyols, and
a crosslinker (C) for the epoxy resin.

12 Claims, No Drawings

LAMINATING ADHESIVES CONTAINING POLYURETHANE AND EPOXIDE RESIN

The invention relates to an aqueous composition comprising a polyurethane (A), an epoxy resin (B) obtainable by reacting compounds having epoxide groups with diols or polyols, and a crosslinker (C) for the epoxy resin.

The invention further relates to the use of the aqueous composition as an adhesive, particularly a laminating adhesive, to papers or films coated with the composition, and to the use of the coated films or papers for laminating substances made of wood, metal, etc., especially furniture or automobile interior parts.

Polyurethane dispersions find use for example as laminating adhesives.

In this case generally the substrate, a furniture part for example, is first coated with the laminating adhesive. To start with the coatings obtained are generally not tacky. Only before the laminating operation is the adhesive activated, by heat treatment or irradiation with high-energy light, for example. In that case the crystalline polyester segments in the polyurethane melt, and the coating becomes tacky. Following this activation, the 2nd substrate, generally a paper sheet or polymer film, is applied.

Requirements imposed on a laminating adhesive include high strength of the laminated bond obtained, in particular a high thermal stability.

Good processing properties in the adhesive are also desired.

These advantages should if possible be achieved both with 1K and with 2K systems. 1K (one-component) systems already include a crosslinker and are stable on storage; in the case of 2K (two-component) systems the crosslinker is not added until shortly before use of the adhesive.

1K systems are of particular interest.

In particular it would be advantageous to be able to apply the adhesive to the paper or the polymer film to be laminated and to store these storage-stable, coated papers and polymer films until their subsequent use.

EP-A-922720 and EP-A-100508 disclose storage-stable polyurethane adhesives which comprise surface-deactivated solid isocyanate particles as crosslinkers. A problem here is the preparation of the crosslinker; the polyisocyanate particles are first ground, in a procedure subject to safety precautions, and then deactivated on the surface.

EP-A-542072 discloses the preparation of a polyurethane-epoxy resin mixture by preparation of the polyurethane in organic solution, addition of the epoxy resin, and subsequent dispersing in water.

DE-A-10219687 (PF 53490), unpublished at the priority date of the present specification, discloses mixtures of polyurethane with polymers which contain epoxy groups and are obtainable by free-radical addition polymerization.

Laminating adhesives which exhibit the advantages described above were an object of the present invention.

Accordingly the composition defined at the outset and its use have been found.

The aqueous compositions of the invention comprise a polyurethane as one of their components. The polyurethane is in particular in the form of a polyurethane dispersed in water.

The polyurethanes used include in particular diisocyanates a) and diols b) as synthesis components.

Particular mention may be made as diisocyanates of those diisocyanates of the formula $X(NCO)_2$, where X is an aliphatic hydrocarbon radical having 4 to 12 carbon atoms, a cycloaliphatic or aromatic hydrocarbon radical having 6 to 15 carbon atoms, or an araliphatic hydrocarbon radical having 7 to 15 carbon atoms. Examples of such diisocyanates include tetramethylene diisocyanate, hexamethylene diisocyanate (HDI), dode-camethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)-propane, trimethylhexane diisocyanate, 1,4-diisocyanatobenzene, 2,4-diisocyanatotoluene, 2,6-diisocyanatotoluene (TDI), 4,4'-diisocyanatodiphenylmethane, 2,4'-diisocyanatodiphenylmethane (MDI), p-xylylene diisocyanate, tetramethylxylylene diisocyanate (TMXDI), the isomers of bis(4-isocyanatocyclohexyl)methane (HMDI) such as the trans/trans, the cis/cis, and the cis/trans isomer, and mixtures of these compounds.

Disocyanates of this kind are available commercially.

Particularly important mixtures of these isocyanates are the mixtures of the respective structural isomers of diisocyanatotoluene and diisocyanatodiphenylmethane; the mixture of 80 mol % 2,4-diisocyanatotoluene and 20 mol % 2,6-diisocyanatotoluene is particularly suitable. Also of particular advantage are the mixtures of aromatic isocyanates such as 2,4-diisocyanatotoluene and/or 2,6-diisocyanatotoluene with aliphatic or cycloaliphatic isocyanates such as hexamethylene diisocyanate or IPDI, in which case the preferred ratio of the aliphatic to the aromatic isocyanates is from 4:1 to 1:4.

Compounds used to synthesize the polyurethanes, in addition to those mentioned above, also include isocyanates which in addition to the free isocyanate groups carry further, blocked isocyanate groups, e.g., uretdione groups or carbodiimide groups.

With a view to effective film-forming and elasticity suitable diols (b) are principally relatively high molecular weight diols (b1), having a molecular weight of from about 500 to 5000, preferably from about 1000 to 3000 g/mol.

The diols (b1) are in particular polyesterpolyols, which are known, for example, from Ullmanns Encyklopädie der technischen Chemie, 4th edition, volume 19, pp. 62 to 65. It is preferred to use polyesterpolyols which are obtained by reacting dihydric alcohols with dibasic carboxylic acids. Instead of the free polycarboxylic acids it is also possible to use the corresponding polycarboxylic anhydrides or corresponding polycarboxylic esters of lower alcohols or mixtures thereof to prepare the polyesterpolyols. The polycarboxylic acids can be aliphatic, cycloaliphatic, araliphatic, aromatic or heterocyclic and can if appropriate be substituted, by halogen atoms for example, and/or unsaturated. Examples thereof include the following: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, and dimeric fatty acids. Preferred dicarboxylic acids are those of the formula $HOOC—(CH_2)_y—COOH$, where y is a number from 1 to 20, preferably an even number from 2 to 20, examples being succinic acid, adipic acid, sebacic acid, and dodecanedicarboxylic acid.

Examples of suitable polyhydric alcohols include ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)-cyclohexane, 2-methylpropane-1,3-diol, methylpentanediols, and also diethylene glycol, triethylene glycol, tetraethylene glycol, polyethylene glycol, dipropylene glycol, polypropylene glycol, and dibutylene glycol and polybutylene glycols. Preferred alcohols are those of the formula $HO—(CH_2)_x—OH$, where x is a number from 1 to 20, preferably an even number from 2 to 20. Examples of such include ethylene glycol, butane-1,4-diol, hexane-1,6-diol, octane-1,8-diol, and dodecane-1,12-diol. Preference is also given to neopentyl glycol.

Suitability is also possessed by polycarbonatediols, such as may be obtained, for example, by reacting phosgene with an excess of the low molecular weight alcohols specified as synthesis components for the polyesterpolyols.

Also suitable are lactone-based polyesterdiols, which are homopolymers or copolymers of lactones, preferably hydroxy-terminated adducts of lactones with suitable di-functional starter molecules. Preferred lactones are those derived from compounds of the formula HO—$(CH_2)_z$—COOH where z is a number from 1 to 20 and where one hydrogen atom of a methylene unit may also be substituted by a $C_1$ to $C_4$ alkyl radical. Examples are ε-caprolactone, β-propiolactone, γ-butyrolactone and/or methyl-ε-caprolactone, and mixtures thereof. Examples of suitable starter components are the low molecular weight dihydric alcohols specified above as a synthesis component for the polyesterpolyols. The corresponding polymers of ε-caprolactone are particularly preferred. Lower polyesterdiols or polyetherdiols as well can be used as starters for preparing the lactone polymers. Instead of the polymers of lactones it is also possible to use the corresponding chemically equivalent polycondensates of the hydroxycarboxylic acids corresponding to the lactones.

Further suitable monomers (b1) are polyetherdiols. They are obtainable in particular by polymerizing ethylene oxide, propylene oxide, butylene oxide, tetrahydrofuran, styrene oxide or epichlorohydrin with itself, in the presence of $BF_3$ for example, or by subjecting these compounds, if appropriate in a mixture or in succession, to addition reaction with starter components containing reactive hydrogen atoms, such as alcohols or amines, examples being water, ethylene glycol, propane-1,2-diol, propane-1,3-diol, 1,2-bis(4-hydroxydiphenyl)propane, and aniline. Particular preference is given to polytetrahydrofuran with a molecular weight of from 240 to 5000, and in particular of from 500 to 4500. Additionally mixtures of polyesterdiols and polyetherdiols can be used as monomers (b1).

Likewise suitable are polyhydroxyolefins, preferably those having 2 terminal hydroxyl groups, e.g., α,ω-dihydroxypolybutadiene, α,ω-dihydroxypolymethacrylic esters or α,ω-dihydroxypolyacrylic esters, as monomers (c1). Such compounds are known for example from EP-A 0622378. Further suitable polyols are polacetals, polysiloxanes, and alkyd resins.

The polyols can also be used as mixtures in a ratio of from 0.1:1 to 1:9.

The hardness and the elasticity modulus of the polyurethanes (A) can be increased by using as diols (b) not only the diols (b1) but also low molecular weight diols (b2) having a molecular weight of from about 60 to 500, preferably from 62 to 200 g/mol.

Monomers (b2) used are in particular the synthesis components of the short-chain alkanediols specified for preparing polyesterpolyols, preference being given to diols having 2 to 12 carbon atoms, unbranched diols having 2 to 12 carbons atoms and an even number of carbon atoms, and also to pentane-1,5-diol and neopentyl glycol.

The fraction of diols (b1), based on the total amount of diols (b), is preferably from 10 to 100 mol %, and the fraction of the monomers (b2), based on the total amount of diols (b), is preferably from 0 to 90 mol %. With particular preference the ratio of the diols (b1) to the monomers (b2) is from 0.1:1 to 5:1, more preferably from 0.2:1 to 2:1.

In order to make the polyurethanes (A) dispersible in water they are synthesized not only from components (a), (b), and, if appropriate, (d) but also from non-(a), non-(b), and non-(d) monomers (c), which carry at least one isocyanate group or at least one group reactive toward isocyanate groups (isocyanate-reactive group) and, furthermore, at least one hydrophilic group or a group which can be converted into a hydrophilic group. In the test below the term "hydrophilic groups or potentially hydrophilic groups" is abbreviated to "(potentially) hydrophilic groups". The (potentially) hydrophilic groups react with isocyanates at a substantially slower rate than do the functional groups of the monomers used to synthesize the polymer main chain.

The fraction of the components having (potentially) hydrophilic groups among the total quantity of components (a), (b), (c), (d), and (e) is generally such that the molar amount of the (potentially) hydrophilic groups, based on the amount by weight of all monomers (a) to (e), is from 30 to 1000, preferably from 50 to 500, and more preferably from 80 to 300 mmol/kg.

The (potentially) hydrophilic groups can be nonionic or, preferably, (potentially) ionic hydrophilic groups.

Particularly suitable nonionic hydrophilic groups are polyethylene glycol ethers composed of preferably from 5 to 100, more preferably from 10 to 80 ethylene oxide repeating units. The amount of polyethylene oxide units is generally from 0 to 10% by weight, preferably from 0 to 6% by weight, based on the amount by weight of all monomers (a) to (e).

Preferred monomers having nonionic hydrophilic groups are polyethylene oxide diols, polyethylene oxide monools, and the reaction products of a polyethylene glycol and a diisocyanate which carry a terminally etherified polyethylene glycol radical. Diisocyanates of this kind and processes for preparing them are specified in U.S. Pat. No. 3,905,929 and U.S. Pat. No. 3,920,598.

Ionic hydrophilic groups are, in particular, anionic groups such as the sulfonate, the carboxylate, and the phosphate group in the form of their alkali metal salts or ammonium salts, and also cationic groups such as ammonium groups, especially protonated tertiary amino groups or quaternary ammonium groups.

Potentially ionic hydrophilic groups are, in particular, those which can be converted into the abovementioned ionic hydrophilic groups by simple neutralization, hydrolysis or quaternization reactions, in other words, for example, carboxylic acid groups or tertiary amino groups.

(Potentially) ionic monomers (c) are described at length in, for example, Ullmanns Encyklopädie der technischen Chemie, 4th edition, volume 19, pp. 311-313 and in, for example, DE-A 1 495 745.

Of particular practical importance as (potentially) cationic monomers (c) are, in particular, monomers containing tertiary amino groups, examples being tris(hydroxyalkyl)amines, N,N'-bis(hydroxyalkyl)alkylamines, N-hydroxyalkyldialkylamines, tris(aminoalkyl)amines, N,N'-bis(aminoalkyl)alkylamines, and N-aminoalkyldialkylamines, the alkyl radicals and alkanediyl units of these tertiary amines consisting independently of one another of 1 to 6 carbon atoms. Also suitable are polyethers containing tertiary nitrogen atoms and preferably two terminal hydroxyl groups, such as are obtainable in conventional manner, for example, by alkoxylating amines containing two hydrogen atoms attached to amine nitrogen, such as methyl-amine, aniline or N,N'-dimethylhydrazine. Polyethers of this kind generally have a molar weight of between 500 and 6000 g/mol.

These tertiary amines are converted into the ammonium salts either with acids, preferably strong mineral acids such as phosphoric acid, sulfuric acid, hydrohalic acids, or strong organic acids, or by reaction with suitable quaternizing agents such as $C_1$ to $C_6$ alkyl halides or benzyl halides, e.g., bromides or chlorides.

Suitable monomers having (potentially) anionic groups normally include aliphatic, cycloaliphatic, araliphatic or aromatic carboxylic acids and sulfonic acids which carry at least one alcoholic hydroxyl group or at least one primary or secondary amino group.

Preference is given to dihydroxyalkyl carboxylic acids, especially those having 3 to 10 carbon atoms, such as are also described in U.S. Pat. No. 3,412,054. Particular preference is given to compounds of the formula ($c_1$)

in which $R^1$ and $R^2$ are a $C_1$ to $C_4$ alkanediyl (unit) and $R^3$ is a $C_1$ to $C_4$ alkyl (unit), and especially dimethylolpropionic acid (DMPA).

Also suitable are corresponding dihydroxysulfonic acids and dihydroxyphosphonic acids such as 2,3-dihydroxypropanephosphonic acid.

Otherwise suitable are dihydroxyl compounds having a molecular weight of more than 500 to 10 000 g/mol and at least 2 carboxylate groups, which are known from DE-A 3 911 827. They are obtainable by reacting dihydroxyl compounds with tetracarboxylic dianhydrides such as pyromellitic dianhydride or cyclopentanetetracarboxylic dianhydride in a molar ratio of from 2:1 to 1.05:1 in a polyaddition reaction. Particularly suitable dihydroxyl compounds are the monomers (b2) cited as chain extenders and also the diols (b1).

Suitable monomers (c) containing amino groups reactive toward isocyanates include aminocarboxylic acids such as lysine, β-alanine or the adducts of aliphatic diprimary diamines with α,β-unsaturated carboxylic or sulfonic acids that are specified in DE-A 2034479.

Such compounds obey, for example, the formula ($c_2$)

$$H_2N-R^4-NH-R^5-X \qquad (c_2)$$

where
$R^4$ and $R^5$ independently of one another are a $C_1$ to $C_6$ alkanediyl unit, preferably ethylene
and X is COOH or $SO_3H$.

Particularly preferred compounds of the formula ($c_2$) are N-(2-aminoethyl)-2-aminoethanecarboxylic acid and also N-(2-aminoethyl)-2-aminoethanesulfonic acid and the corresponding alkali metal salts, with Na being a particularly preferred counterion.

Also preferred are the adducts of the abovementioned aliphatic diprimary diamines with 2-acrylamido-2-methylpropanesulfonic acid, as described for example in U.S. Pat. No. 1,954,090. Monomers c) likewise highly suitable are adducts of aliphatic diamines, ethylenediamine for example, or else propylenediamine with acrylates or methacrylates of the alkali metals, especially sodium.

Where monomers with potentially ionic groups are used their conversion into the ionic form may take place before, during or, preferably, after the isocyanate polyaddition, since the ionic monomers are frequently difficult to dissolve in the reaction mixture. With particular preference the sulfonate or carboxylate groups are present in the form of their salts with an alkali metal ion or ammonium ion as counterion.

The monomers (d), which are different from the monomers (a) to (c) and which may if appropriate be part of the polyurethane (A), serve generally for crosslinking or chain extension. They generally comprise nonphenolic alcohols with a functionality of more than 2, amines having 2 or more primary and/or secondary amino groups, and compounds which as well as one or more alcoholic hydroxyl groups carry one or more primary and/or secondary amino groups.

Alcohols having a functionality of more than 2, which may be used in order to set a certain degree of branching or crosslinking, include for example trimethylolpropane, glycerol, or sugars.

Also suitable are monoalcohols which as well as the hydroxyl group carry a further isocyanate-reactive group, such as monoalcohols having one or more primary and/or secondary amino groups, monoethanolamine for example.

Polyamines having two or more primary and/or secondary amino groups are used especially when the chain extension and/or crosslinking is to take place in the presence of water, since amines generally react more quickly than alcohols or water with isocyanates. This is frequently necessary when the desire is for aqueous dispersions of crosslinked polyurethanes or polyurethanes having a high molar weight. In such cases the approach taken is to prepare prepolymers with isocyanate groups, to disperse them rapidly in water, and then to subject them to chain extension or crosslinking by adding compounds having two or more isocyanate-reactive amino groups.

Amines suitable for this purpose are generally polyfunctional amines of the molar weight range from 32 to 500 g/mol, preferably from 60 to 300 g/mol, which contain at least two amino groups selected from the group consisting of primary and secondary amino groups. Examples of such are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane.

The amines can also be used in blocked form, e.g., in the form of the corresponding ketimines (see for example CA-A 1 129 128), ketazines (cf. e.g. U.S. Pat. No. 4,269,748) or amine salts (see U.S. Pat. No. 4,292,226). Oxazolidines as well, as used for example in U.S. Pat. No. 4,192,937, represent blocked polyamines which can be used for the preparation of the polyurethanes of the invention, for chain extension of the prepolymers. Where blocked polyamines of this kind are used they are generally mixed with the prepolymers in the absence of water and this mixture is then mixed with the dispersion water or with a portion of the dispersion water, so that the corresponding polyamines are liberated by hydrolysis.

It is preferred to use mixtures of diamines and triamines, more preferably mixtures of isophoronediamine (IPDA) and diethylenetriamine (DETA).

The polyurethanes (A) contain preferably from 1 to 30 mol %, more preferably from 4 to 25 mol %, based on the total amount of components (b) and (d), of a polyamine having at least two isocyanate-reactive amino groups as monomer (d).

Alcohols having a functionality of more than 2, which may be used in order to set a certain degree of branching or crosslinking, include for example trimethylolpropane, glycerol, or sugars.

For the same purpose it is also possible to use, as monomers (d), isocyanates having a functionality of more than two. Examples of standard commercial compounds are the isocyanurate or the biuret of hexamethylene diisocyanate.

Monomers (e), which are used optionally, are monoisocyanates, monoalcohols, and mono-primary and -secondary amines. Their fraction is generally not more than 10 mol %, based on the total molar amount of the monomers. These monofunctional compounds customarily carry further functional groups such as olefinic groups or carbonyl groups and serve to introduce into the polyurethane functional groups which facilitate the dispersing and/or the crosslinking or further polymer-analogous reaction of the polyurethane. Monomers suitable for this purpose include those such as isopropenyl-α,α-dimethylbenzyl isocyanate (TMI) and esters of acrylic or methacrylic acid such as hydroxyethyl acrylate or hydroxyethyl methacrylate.

Coatings having a particularly good profile of properties are obtained in particular when the monomers (a) used are essentially only aliphatic diisocyanates, cycloaliphatic diisocyanates or TMXDI and essentially only polyesterdiols, synthesized from the stated aliphatic diols and diacids, are used as monomer (b1).

This monomer combination is supplemented in outstanding fashion as component (c) by salts of diamino acids; very particularly by N-(2-aminoethyl)-2-aminoethanesulfonic acid, N-(2-aminoethyl)-2-aminoethanecarboxylic acids, and their corresponding alkali metal salts, the Na salts being the most suitable, and also by dimethylolpropionic acid or by the adduct of ethylenediamine with alkali metal acrylates.

Within the field of polyurethane chemistry it is general knowledge how the molecular weight of polyurethanes can be adjusted by selecting the proportions of the mutually reactive monomers and also the arithmetic mean of the number of reactive functional groups per molecule.

Components (a) to (e) and their respective molar amounts are normally chosen so that the ratio A:B, where A is the molar amount of isocyanate groups and B is the sum of the molar amount of the hydroxyl groups and the molar amount of the functional groups which are able to react with isocyanates in an addition reaction, is from 0.5:1 to 2:1, preferably from 0.8:1 to 1.5, more preferably from 0.9:1 to 1.2:1. With very particular preference the ratio A:B is as close as possible to 1:1.

The monomers (a) to (e) employed carry on average usually from 1.5 to 2.5, preferably from 1.9 to 2.1, more preferably 2.0 isocyanate groups and/or functional groups which are able to react with isocyanates in an addition reaction.

The polyaddition of components (a) to (e) for preparing the polyurethane (A) present in the aqueous dispersions of the invention can take place at reaction temperatures of 20 to 180° C., preferably 70 to 150° C., under atmospheric pressure or under the autogenous pressure.

The reaction times required are usually in the range from 1 to 20 hours, in particular from 1.5 to 10 hours. It is known in the field of polyurethane chemistry how the reaction time can be influenced by a multiplicity of parameters such as temperature, monomer concentration, and monomer reactivity.

The reaction, i.e., the polyaddition of the monomers a), b), c), and, if appropriate, d) and e) for the preparation of the polyurethanes (A), can be catalyzed with the aid of organic or organometallic compounds. Suitable organometallic compounds include dibutyltin dilaurate, tin (II) octoate or diazabicyclo[2.2.2]octane. Suitable catalysts of the reaction of the monomers a), b), c), and, if appropriate, d) and e) are also salts of cesium, especially cesium carboxylates such as, for example, the formate, acetate, propionate, hexanoate or the 2-ethylhexanoate of cesium.

Suitable polymerization apparatus for carrying out the polyaddition, i.e., the reaction of the monomers a), b), c), and, if appropriate, d) and e), includes stirred tanks, especially when a low viscosity with effective heat removal is ensured by the use of solvents.

Preferred solvents are of infinite miscibility with water, have a boiling point under atmospheric pressure of from 40 to 100° C., and react slowly if at all with the monomers.

The dispersions are normally prepared by one of the following processes:

In the acetone process an ionic polyurethane is prepared from components (a) to (c) in a water-miscible solvent which boils below 100° C. under atmospheric pressure. Water is added until a dispersion is formed in which water represents the continuous phase.

The prepolymer mixing process differs from the acetone process in that the initial preparation product is not a fully reacted (potentially) ionic polyurethane but rather a prepolymer which carries isocyanate groups. The components in this case are chosen so that the above-defined ratio A:B is greater than 1.0 to 3, preferably 1.05 to 1.5. The prepolymer is first dispersed in water and then, if appropriate, crosslinked by reaction of the isocyanate groups with amines which carry more than 2 isocyanate-reactive amino groups or chain-extended with amines which carry 2 isocyanate-reactive amino groups. Chain extension also takes place when no amine is added. In this case isocyanate groups are hydrolyzed to amino groups, which are consumed by reaction with remaining isocyanate groups of the prepolymers, thereby extending the chain.

If a solvent has been used in the preparation of the polyurethane (A), it is common to remove the greatest part of the solvent from the dispersion, by distillation under reduced pressure for example. The dispersions preferably have a solvent content of less than 10% by weight and are with particular preference free from solvents.

The composition of the invention comprises not only the polyurethane but also an epoxy resin.

The epoxy resin is a polymeric compound having preferably at least 2, more preferably from 2 to 4, very preferably 2 epoxide groups.

The epoxy resin is obtainable by reacting compounds containing epoxide groups with diols or polyols. Particularly suitable compounds containing epoxide groups are those which are substituted by a halogen atom, a chlorine atom in particular, on a carbon atom adjacent to the epoxide group; epichlorohydrin may be mentioned here with preference. Reaction of these compounds with diols or polyols gives epoxy resins having terminal epoxide groups.

Preferred diols or polyols are aromatic compounds. Diols are preferred. Particular preference is given to bisphenol A as diol.

Particularly preferred epoxy resins are reaction products of epichlorohydrin with bisphenol A.

Suitable epoxy resins preferably have a number-average molar weight of between 300 and 10 000 g/mol, in particular between 500 and 5000 g/mol.

The softening temperature of suitable epoxy resins is preferably between 50 and 150° C., more preferably between 80 and 130° C.

The amounts of the polyurethane resin A) and of the epoxy resin B) are in each case preferably from 1 to 99% by weight.

With particular preference the amount of the polyurethane resin is from 50 to 99%, more preferably from 60 to 90%, and in particular from 65 to 75% by weight.

The amount of the epoxy resin B) is with particular preference from 1 to 50% by weight, more preferably from 10 to 40% by weight, and in particular from 25 to 35% by weight.

The weight data relating to the polyurethane A) and epoxy resin B) are based on the sum of A)+B) by weight.

The epoxy resin and the polyurethane can be combined and mixed in customary fashion.

The epoxy resin can in particular also be added to the aqueous polyurethane dispersion.

Preferably the epoxy resin is added to the solution of the polyurethane (see acetone process above) or to the solution of the polyurethane prepolymer (see prepolymer mixing process above) before the polyurethane or prepolymer, respectively, is dispersed in water. The addition of the epoxy resin is followed by the addition of water or by dispersing in water, as described above, and then also by the further reaction of the prepolymer, as described above.

The composition of the invention further comprises (C) a crosslinker for the epoxy resin.

The crosslinker is in particular a compound having at least two reactive groups which react with epoxy groups. These reactive groups can be, for example, amino, carboxyl or hydroxyl groups. Preference is given to amino groups.

The crosslinker is preferably emulsifiable, dispersible or soluble in water. In particular the crosslinker is soluble in water; that is, at 21° C. at least 100 g of crosslinker, or at least 300 g of crosslinker, dissolve in 1000 g of water.

The compounds in question are preferably compounds having from 2 to 6 reactive groups, in particular from 2 to 4 reactive groups, very preferably 2 or 3 reactive groups.

Suitable examples include polyisocyanates, particularly the diisocyanates set out above.

Likewise suitable are aromatic or aliphatic polyols, including diols in particular. Also particularly suitable are alkylenediols such as butanediol, hexanediol, etc.

Suitability is also possessed accordingly by aromatic or aliphatic polycarboxylic acids, particularly dicarboxylic acids or anhydrides of polycarboxylic or dicarboxylic acids.

Suitable amine compounds are, for example, aliphatic or aromatic compounds containing primary or secondary, preferably primary, amino groups.

The reactive groups of the crosslinker may also have been blocked, however; in this case the reactive group is liberated only by means of a deblocking reaction, which proceeds at elevated temperatures generally above 50° C., in particular above 80° C.

The aqueous compositions are suitable both as 1K and 2K systems. 1K systems include the crosslinker and are stable on storage; in 2K systems the crosslinker is not added until shortly before use. In the case of the present invention compositions with non-blocked groups of the crosslinker are also suitable as 1K systems.

The amines can be blocked with, for example, carboxylic acids and in that case are in the form of acid amides.

The crosslinker may be added to the actual polyurethane, to the epoxy resin, or only to the mixture of the two.

In the case of the crosslinker containing free reactive groups the addition is not made until shortly before further processing.

In the case of a crosslinker with blocked reactive groups the mixture of A), B), and C) is stable on storage.

The addition can therefore be made at an arbitrary point in time and the use of the system as an adhesive can take place at an arbitrary, later point in time.

The amount of the crosslinker is selected in particular such that the molar ratio of the epoxy groups of B) to the reactive groups of C) is from 0.1:1 to 1:0.1, more preferably from 0.5:1 to 1:0.5, in particular from 0.8:1 to 1:0.8.

The aqueous composition may also include other crosslinkers, examples being crosslinkers for the polyurethane (A), such as isocyanates, carbodiimides or aziridines.

The aqueous compositions of the invention are suitable as binders for coating compositions, impregnating compositions or adhesives and for these utilities may comprise further auxiliaries and additives such as blowing agents, defoamers, emulsifiers, thickeners, and thixotropic agents, and also colorants such as dyes and pigments.

The aqueous compositions of the invention are suitable for coating articles made of metal, plastic, paper, textile, leather or wood, by being applied to these articles in accordance with the usual methods, that is for example by spraying or knifecoating in the form of a film, and being dried. Drying can take place at room temperature or else at elevated temperature.

In particular the compositions of the invention are suitable as adhesives, with particular preference as laminating adhesives. A distinction is to be made in this case between the 1K and the 2K systems (see above).

Articles of metal, plastic, paper, leather or wood can likewise be bonded adhesively to other articles, preferably the aforementioned articles, by the aqueous dispersion of the invention being applied in the form of a film to at least one of these articles and that article being joined with another article before or after the film has dried. In this case the film is preferably heated to temperatures from 50 to 150° C.

In the case of use as a laminating adhesive, polymer films, paper, particularly decorative papers coated or impregnated with a polymer, or leather are bonded in particular to articles made of wood, which is taken to include bound wood fiber materials such as chipboard or other board made from cellulose materials, or metal or plastic; for example, furniture items or furniture parts are laminated with paper or with polymer films, or automobile interior parts are laminated with polymer films.

In the case of the 1K systems it is also possible first to apply the composition of the invention to the paper or the polymer film that is to be laminated and to store the coated polymer film or paper until, at a later point in time, lamination is to take place—lamination of the furniture part or automobile interior part, for example.

The use of the composition of the invention as an adhesive, including as a laminating adhesive, produces bonds of high strength, including in particular high thermal stability, i.e., strength at elevated temperature. The compositions of the invention are storage-stable in the form of 1K systems (crosslinker with blocked reactive groups) and can be applied to the polymer films or paper for which lamination is intended, and stored in that form.

EXAMPLES

I) Preparation of the Dispersions

Example 1

Preparation of a Polyurethane/Epoxy Dispersion 485 g of a polyesterdiol made from adipic acid and butane-1,4-diol (OHN=46), 0.025 g of DBTL and 130 g of acetone are introduced as an initial charge and at 60° C. 23.7 g of TDI are added and the components are reacted at 65° C. for 60 minutes. Then 22.9 g of HDI are added and reaction is continued for a further 3 hours 52 minutes. The reaction mixture is diluted with 520 g of acetone and cooled to 50° C. The NCO content is 0.53%. Chain extension is carried out with 25.3 g of a 40% strength aqueous solution of an adduct of ethylenediamine Na acrylate. After 5 minutes dilution is carried out with 400 g of water and the addition takes place of 233 g of Epikote 1007 (epoxide based on bisphenol A) in solution in 233 g of acetone, followed by thorough stirring and further dispersion with 550 g of water.

The acetone is distilled off under reduced pressure at temperatures up to 42° C. and the solids content is adjusted to 45%.

Example 2

731.7 g of a polyesterdiol made from adipic acid and butane-1,4-diol (OHN=46), 26.8 g of DMPA, 0.1 g of dibutyltin dilaurate, and 100 g of acetone are introduced as an initial charge and at 60° C. 84.1 g of HDI are added and reaction is continued at 65° C. for 6 hours 14 minutes. The reaction mixture is diluted with 900 g of acetone and cooled to 50° C. The NCO content is 0.17%. Neutralization is carried out with 12.1 g of triethyl-amine and dilution with 200 g of water. Then 95 g of Rütapox 0194 (epoxide based on bisphenol A) in solution in 95 g of acetone are added, the components are stirred thoroughly, and dispersion is continued with 1230 g of water.

The acetone is distilled off under reduced pressure at temperatures up to 42° C. and the solids content is adjusted to 40%.

Comparative Example without Epoxide

Luphene® D 200 A: a commercial polyurethane laminating adhesive without epoxide

II) Preparation of the Adhesive Composition

The ingredients were blended in accordance with the table below to prepare adhesive compositions. The numbers are parts by weight (solids).

| Formulations: | A | B | C |
|---|---|---|---|
| Example 2 | 100 | | |
| Luphen D 200 A | | | 100 |
| Example 1 | | 100 | |
| Borchigel L 75 N[1] | 2 | 2 | 2 |
| Basonat F 200 WD[2] | | | 5 |
| N-(3-Aminopropyl)imidazole[3] | 0.5 | 0.5 | |

[1]Thickener made of polyurethane
[2]Polyisocyanate crosslinker
[3]Amine crosslinker for epoxide III) Performance Tests A) Film Precoating For this test laminating films made from thermoplastic polyethylene (TPO) were coated on their reverse with the formulations. The coated films were laminated in one case immediately after drying of the coating and in another case after two weeks of storage of the coated films, lamination taking place onto test specimens made of beech (BH) or ABS. Laminating conditions: the test specimens were heated to the laminating temperature (ABS: 70° C., BH 150° C.) in a heating cabinet. Subsequently the coated film is laminated on under pressure (5 bar). The bonds were tested in a 180° C. peel test with a peel rate of 100 mm/min. The peel strength (at 21° C.) is reported in N/mm:

| Adhesive | Immediately after coating | | After 2 weeks' storage of the coated film | |
|---|---|---|---|---|
| | BH | ABS | BH | ABS |
| A | 2.2 | 2.1 | 2.1 | 2.3 |
| B | 2 | 0.4 | 1.8 | 0.7 |
| C | 2.3 | 0.5 | 1.1 | 0.4 |

With the adhesives A and B of the invention there is virtually no drop in the values even after 2 weeks of storage of the coated film as compared with the initial values.

B) Laminating Adhesives (All Tests: Plasticized PVC Film Laminated to ABS)

| Substrate: | ABS (FORD Flour Grain 089/30 - 40 μm)/plasticized PVC film from Benecke (TWIST-AUDI SF 5227/040 SE) 1 mm |
|---|---|
| Applicator: | 1 mm toothed knife |
| Drying: | 90 minutes at room temperature (RT) |
| Laminating: | BIMA laboratory press 40 seconds at 0.1 N/mm², heating top: 90° C. (last 14.9 seconds 65-68.8° C.) |
| Peel strength: | 5 days at room temperature and 10 days of storage at 100° C.; then testing with roller peel apparatus in controlled-climate chamber at 100° C. |

| Adhesive | Laminating immediately after preparation of the adhesive | | Laminating not until 72 h storage of the adhesive | |
|---|---|---|---|---|
| | before storage | after storage | before storage | after storage |
| A | 0.2 | 0.23 | 0.46 | 0.34 |
| B | 0.3 | 0.37 | 0.69 | 0.15 |
| C | 0.3 | 0.16 | coagulated | Coagulated |

When the adhesive was stored prior to lamination it was no longer possible to obtain any values in the case of C. The adhesive C is not stable on storage.

The invention claimed is:

1. The storage-stable aqueous dispersion of a polyurethane resin, an epoxy resin, and amine crosslinker for said epoxy resin, made by the method comprising:
   (A) adding an epoxy resin (1) which is a reaction product of a compound having an epoxide group and a diol or polyol, to a solvent solution of a polyurethane (2) having hydrophilic groups, to form a mixture;
   (B) dispersing said mixture in water to form an aqueous dispersion of (1) and (2), and optionally, removing at least 90% of by weight of said solvent; and
   (C) adding an amine crosslinker (3) for the epoxy resin (1) to the aqueous dispersion of (1) and (2);
   wherein the amount of the polyurethane resin (2) is 50 to 99% and the amount of the epoxy resin (1) is 1 to 50% by weight, based on the sum of resins (1) and (2).

2. The storage-stable aqueous dispersion of claim 1, wherein the amine crosslinker for the epoxy resin is a non-blocked amine crosslinker for said epoxy resin.

3. The storage-stable aqueous dispersion of claim 1 or 2, wherein said polyurethane having hydrophilic groups is synthesized from
   (a) diisocyanates,
   (b) diols or polyols of which (i) from 10 to 100 mol %, based on the total amount of diols or polyols (b), have a molecular weight of from 500 to 5000 and (ii) from 0 to 90 mol %, based on the total amount of diols or polyols (b), have a molecular weight of from 60 to 500 g/mol, and
   (c) non-(a) and non-(b) monomers having at least one isocyanate group or at least one group reactive toward isocyanate groups, and further carrying at least one hydrophilic or potentially hydrophilic group to make the polyurethanes dispersible in water.

4. Paper, polymer film, or leather coated with a storage-stable aqueous dispersion of claim 1 or 2.

5. The storage-stable aqueous dispersion of claim 1 or 2, wherein said epoxy resin reaction product of a compound having an epoxide group and a diol or polyol is the reaction product of bisphenol A with epichlorohydrin.

6. The storage-stable aqueous dispersion of claim 1 or 2, wherein said amine crosslinker is a compound having at least two reactive amino groups.

7. The storage-stable aqueous dispersion of claim 1 or 2, which is an adhesive.

8. The storage-stable aqueous dispersion of claim 7, which is a laminating adhesive.

9. The storage-stable aqueous dispersion of claim 8, wherein the laminating adhesive is storage-stable for 2 weeks.

10. Paper, polymer film, or leather coated with an adhesive of claim 7.

11. The storage-stable aqueous dispersion of claim 1, wherein the amount of the polyurethane resin is 60 to 90% and the amount of the epoxy resin is 10 to 40% by weight, based on the sum of resins (1) and (2).

12. The storage-stable aqueous dispersion of claim 1, wherein the amount of the polyurethane resin is 65 to 75% and the amount of the epoxy resin is 25 to 35% by weight, based on the sum of resins (1) and (2).

* * * * *